US012580629B2

(12) United States Patent
Da Silva et al.

(10) Patent No.: US 12,580,629 B2
(45) Date of Patent: Mar. 17, 2026

(54) METHOD SUPPORTING INTER-CELL MOBILITY BETWEEN DIFFERENT FREQUENCIES

(71) Applicant: Telefonaktiebolaget LM Ericsson (publ), Stockholm (SE)

(72) Inventors: Icaro Leonardo Da Silva, Solna (SE); Helka-Liina Määttänen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 18/039,597

(22) PCT Filed: Dec. 10, 2021

(86) PCT No.: PCT/IB2021/061598
§ 371 (c)(1),
(2) Date: May 31, 2023

(87) PCT Pub. No.: WO2022/123539
PCT Pub. Date: Jun. 16, 2022

(65) Prior Publication Data
US 2024/0007169 A1     Jan. 4, 2024

Related U.S. Application Data

(60) Provisional application No. 63/124,555, filed on Dec. 11, 2020.

(51) Int. Cl.
*H04B 7/06* (2006.01)
*H04B 7/08* (2006.01)
*H04W 36/00* (2009.01)

(52) U.S. Cl.
CPC ......... *H04B 7/06968* (2023.05); *H04B 7/088* (2013.01); *H04W 36/0061* (2013.01)

(58) Field of Classification Search
CPC .............. H04B 7/06968; H04B 7/088; H04W 36/0061
USPC ....................................... 375/262
See application file for complete search history.

(56) References Cited

U.S. PATENT DOCUMENTS

2022/0095127 A1 *  3/2022  Tang ...................... H04L 5/0098
2022/0159772 A1 *  5/2022  Raghavan ............. H04W 76/20

OTHER PUBLICATIONS

International Search Report and Written Opinion of the International Searching Authority, PCT/IB2021/061598, mailed Mar. 17, 2022, 13 pages.

(Continued)

*Primary Examiner* — Fitwi Y Hailegiorgis
(74) *Attorney, Agent, or Firm* — Sage Patent Group

(57) ABSTRACT

A method of operating a user equipment, UE, configured with a plurality of transmission configurations associated with one or more cells, each cell associated with a frequency, includes receiving an indication of a transmission configuration to be activated from the plurality of transmission configurations, the indicated transmission configuration including a first frequency that is different from a second frequency of a current transmission configuration. The method includes operating in accordance with the indicated transmission configuration at the first frequency.

20 Claims, 8 Drawing Sheets

(56)                References Cited

OTHER PUBLICATIONS

Apple Inc., "On Beam Management Enhancement," 3GPP TSG-RAN WB1 Meeting #103-e, R1-2008438, e-Meeting, Oct. 26-Nov. 13, 2020, 19 pages.
Qualcomm Incorporated, "Enchancements on Multi-beam Operation," 3GPP TSG RAN WG1 Meeting #103-e, R1-2009250, Oct. 26-Nov. 13, 2020, 12 pages.
ZTE, "Discussion on Multi-TRP inter-cell operation," 3GPP TSG RAN WG1 #102-e, R1-2005456, e-Meeting, Aug. 17-28, 2020, 3 pages.
Apple Inc., "On Inter-Cell Multi-TRP Enhancement," 3GPP TSG-RAN WG1 Meeting #102-e, R1-2006501, e-Meeting, Aug. 17-28, 2020, 2 pages.
Intel Corporation, "Summary of discussion on physical layer aspects of NR mobility enhancements," 3GPP RSG RAN WG1 Meeting #98bis, R1-1910687, Chongqing, China, Aug. 14-20, 2019, 8 pages.
3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.
3GPP TS 38.214 v16.2.0 (Jun. 2020); 3rd Generation Partnership Project; Technical Specification Group Radio Access Network; NR; Physical layer procedures for data (Release 16); 163 pages.
3GPP TS 38.300 v16.2.0 (Jul. 2020); 3rd Generation Partnership Project; Technical Specification Group Radio Access Network; NR; NR and NG-RAN Overall Description; Stage 2 (Release 16); 148 pages.
3GPP TS 38.321 v16.2.0 (Sep. 2020); 3rd Generation Partnership Project; Technical Specification Group Radio Access Network; NR; Medium Access Control (MAC) protocol specification (Release 16); 154 pages.
3GPP TS 38.211 v16.2.0 (Jun. 2020); 3rd Generation Partnership Project; Technical Specification Group Radio Access Network; NR; Physical channels and modulation (Release 16); 131 pages.
3GPP TS 38.213 v16.2.0 (Jun. 2020); 3rd Generation Partnership Project; Technical Specification Group Radio Access Network; NR; Physical layer procedures for control (Release 16); 176 pages.
Samsung, "New WID: Further enhancements on MIMO for NR," 3GPP TSG RAN Meeting #86, RP-193133, Sitges, Spain, Dec. 9-12, 2019, 5 pages.

* cited by examiner

- LTE AND NR
  - PSS/SSS = PHYSICAL CELL IDENTIFIER (PCI)

- LTE AND NR
  - PSS/SSS IS A SYNC SOURCE

- NR
  - MULTIPLE PSS/SSS WITH SAME PCI TRANSMITTED IN DL BEAMS
  - BEAM SWEEPING DEFINING CELL COVERAGE

PSS/SSS-X

PSS/SSS-X/SSB INDEX 0

PSS/SSS-X/SSB INDEX 1

PSS/SSS-X/SSB INDEX 2

PSS/SSS-X/SSB INDEX 64

BEAM SWEEPING

INTRA-CELL BEAM MANAGEMENT
NO RRC SIGNALLING INVOLVED FOR THE SWITCHING

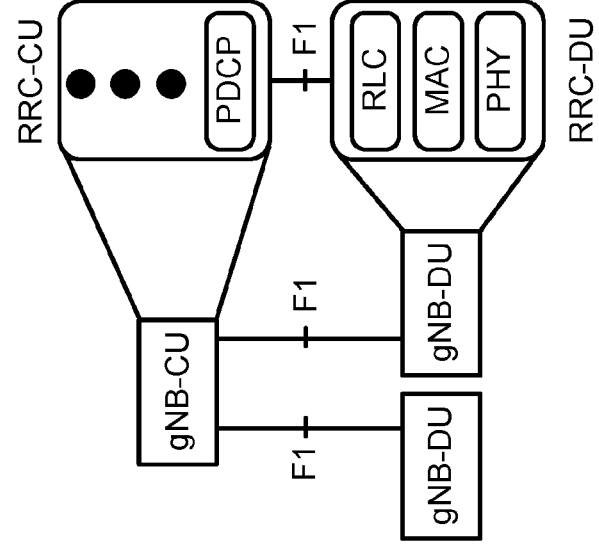
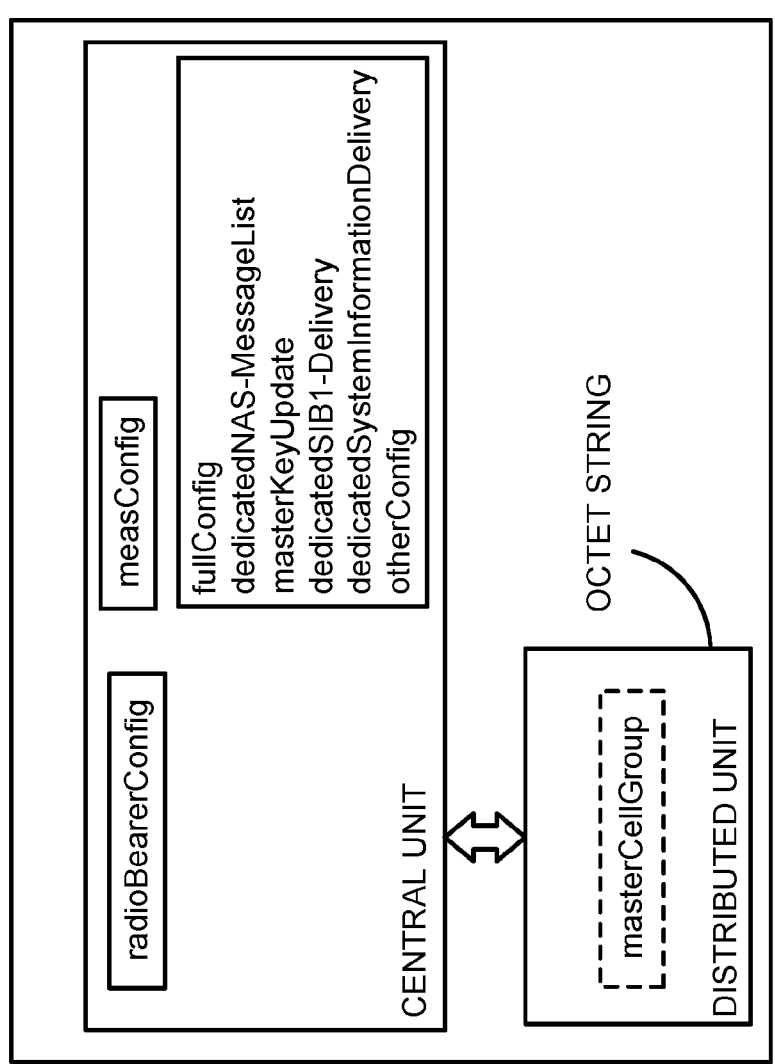
Figure 2B

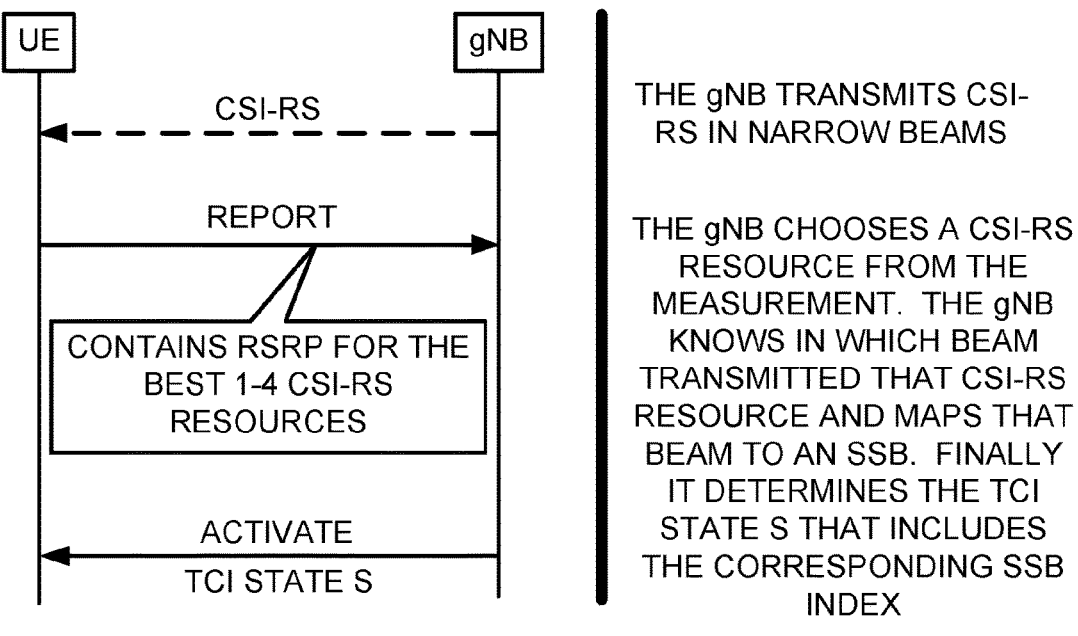
THE gNB TRANSMITS CSI-RS IN NARROW BEAMS
THE gNB CHOOSES A CSI-RS RESOURCE FROM THE MEASUREMENT. THE gNB KNOWS IN WHICH BEAM TRANSMITTED THAT CSI-RS RESOURCE AND MAPS THAT BEAM TO AN SSB. FINALLY IT DETERMINES THE TCI STATE S THAT INCLUDES THE CORRESPONDING SSB INDEX
Figure 3
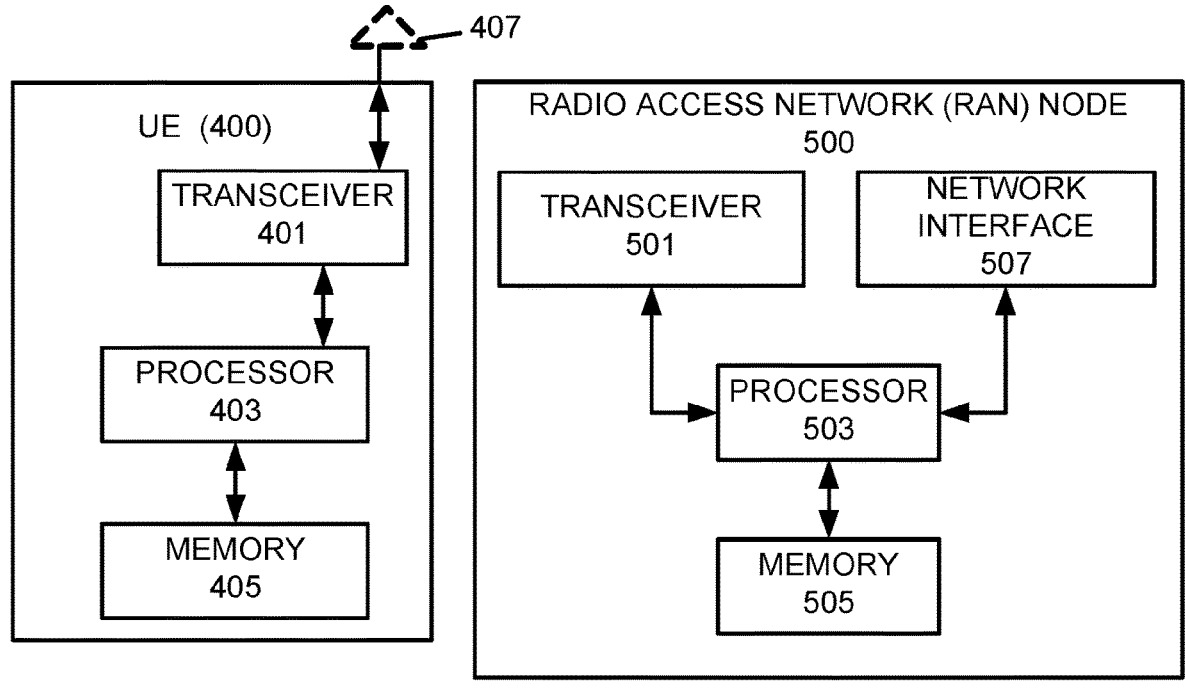
Figure 4          Figure 5

METHOD SUPPORTING INTER-CELL MOBILITY BETWEEN DIFFERENT FREQUENCIES

CROSS REFERENCE TO RELATED APPLICATIONS

The present application is a 35 U.S.C. § 371 national stage application of PCT International Application No. PCT/IB2021/061598 filed on Dec. 10, 2021, which in turn claims the benefit of and priority to U.S. Provisional Patent Application No. 63/124,555, filed Dec. 11, 2020, entitled "METHOD SUPPORTING INTER-CELL MOBILITY BETWEEN DIFFERENT FREQUENCIES," the disclosures of which are hereby incorporated herein by reference in their entirety.

TECHNICAL FIELD

The present disclosure relates generally to communications, and more particularly to communication methods and related devices and nodes supporting wireless communications.

BACKGROUND

New Radio (NG) Mobility in Releases 15 and 16 is discussed below.

Early during the Rel-15 standardization, it was agreed that NR would support two types of mobility: Mobility without radio resource control (RRC) involvement (intra-cell) and Mobility with RRC involvement (inter-cell).

Mobility with RRC involvement is quite similar to the Long Term Evolution (LTE) mobility functionality: it is based on event-driven measurement reporting over RRC, where the user equipment (UE) performs measurement on various reference signals (mapping to cells) and filters these measurements. When the filtered measurements fulfil certain criteria parametrized by the network (NW), the UE will trigger a measurement report. However, differently from LTE a cell may be defined by multiple beams, which may be realized by multiple SS/PBCH (synchronization signal/physical broadcast channel) Blocks (SSB)s transmitted in different directional beams, while in LTE a single broadcasted signal is transmitted, as illustrated in FIG. 1.

FIG. 1 illustrates differences between cell definition in NR and LTE. As illustrated in FIG. 1, in LTE and NR, the primary synchronization signal/secondary synchronization signal (PSS/SSS) can be used as a physical cell identifier (PCI) and as a synch source in a single beam. In NR, multiple PSS/SSS with the same PCI transmitted in multiple downlink (DL) beams where beam sweeping is used and defines cell coverage.

That leads to a procedure where changing beams from different cells may require RRC signaling and a set of UE protocols actions e.g. reset of buffers, etc. An inter-gNB handover procedure is provided in TS 38.300.

Mobility without RRC involvement is also known as beam management. It was designed for a situation where multiple beams cover one cell. Due to the smaller coverage area of these narrow beams, it could be anticipated that a UE would change beam more frequently than it changes cells. To reduce the signaling load for the beam switches, it was decided that RRC signaling would not be required to facilitate such changes. Instead, signaling solution based on Medium Access Control protocol (MAC) Control Element (CE) or Downlink Control Information (DCI) have been introduced for beam management/intra-cell mobility. This is illustrated in FIG. 2A, which illustrates beam switching within the same cell as the UE moves through the cell as illustrated by the arrow.

Three examples of sub-functionality to support beam management are the following:
- L1-RSRP (reference signal received power) reporting on SSB and channel state information—reference signal (CSI-RS);
- MAC CE based activation/deactivation updates of beam indications, so-called Quasi-Co-Location (QCL) source, explained in the following in more details);
- Beam failure recovery/radio link monitoring/beam failure detection.

As these functionalities were designed to handle mobility without RRC involvement, they were limited to intra-cell operation. The present disclosure discusses functionality related to the MAC CE based updates of QCL source, i.e., beam indications, and how prior art addresses this case. In the following, existing concepts in the 5G NR L1 specifications such as Beam indications, QCL source and Transmission Configuration Indicator (TCI) states will be discussed.

Several signals can be transmitted from the same base station antenna from different antenna ports. These signals can have the same large-scale properties, for instance in terms of Doppler shift/spread, average delay spread, or average delay, when measured at the receiver. These antenna ports are then said to be quasi co-located (QCL).

The network can then signal to the UE that two antenna ports are QCL so that the UE interprets that signals from these will have some similar properties. If the UE knows that two antenna ports are QCL with respect to a certain parameter (e.g. Doppler spread), the UE can estimate that parameter based on a reference signal transmitted one of the antenna ports and use that estimate when receiving another reference signal or physical channel the other antenna port. Typically, the first antenna port is represented by a measurement reference signal such as a CSI-RS (known as source RS) and the second antenna port is a demodulation reference signal (DMRS) (known as target RS) for Physical Downlink Shared Channel (PDSCH) or Physical Downlink Control Channel (PDCCH) reception.

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation since the UE can know beforehand the properties of the channel when trying to measure the channel utilizing the DMRS, which may help the UE in for instance selecting an appropriate channel estimation filter.

Information about what assumptions can be made regarding QCL is signaled to the UE from the network. In NR, four types of QCL relations between a transmitted source RS and transmitted target RS were defined:
- Type A: {Doppler shift, Doppler spread, average delay, delay spread}
- Type B: {Doppler shift, Doppler spread}
- Type C: {average delay, Doppler shift}
- Type D: {Spatial Rx parameter}

QCL type D was introduced to facilitate beam management procedures with analog beamforming and is known as spatial QCL. There is currently no strict definition of spatial QCL, but the understanding is that if two transmitted antenna ports are spatially QCL, the UE can use the same receive (Rx) beam to receive signals associated to them. This is helpful for a UE that uses analog beamforming to receive signals, since the UE need to adjust its Rx beam in some direction prior to receiving a certain signal. If the UE knows that the signal is spatially QCL with some other signal it has received earlier, then it can safely use the same Rx beam to also receive this signal. Note that for beam management, the discussion mostly revolves around QCL Type D, but it is also necessary to convey a Type A QCL relation for the RSs to the UE, so that it can estimate all the relevant large-scale parameters. In other words, one could say that two signals are transmitted in the same direction or via the same downlink beams when these are QCL Type D. Hence, the network may give this relation between a channel to be decoded (e.g. PDCCH/PDSCH) and a signal that is known to be transmitted in a given direction that may be used as reference by the UE, like a CSI-RS, SSB, etc.

Typically, this is achieved by configuring the UE with a CSI-RS for tracking (TRS—Tracking Reference Signal) for time/frequency offset estimation (and/or SSB). To be able to use any QCL reference, the UE would have to receive it with a sufficiently good signal to interference and noises ratio (SINR). In many cases, this means that the TRS has to be transmitted in a suitable beam to a certain UE.

Together with the concept of QLC source, the concept of a TCI state is also provided. Each of the M states in the list of TCI states can be interpreted as a list of M possible beams transmitted in the downlink from the network and/or a list of M possible TRPs used by the network to communicate with the UE. The M TCI states can also be interpreted as a combination of one or multiple beams transmitted from one or multiple TRPs.

To introduce dynamics in beam and transmission point (TRP) selection/switching, the UE can be configured through RRC signaling with M TCI states (e.g. during connection setup, resume, reconfiguration, handovers, etc.), where M is up to 128 in frequency range 2 (FR2) for the purpose of PDSCH reception and up to 8 in FR1, depending on UE capability.

In RRC, TCI states are currently configured as part of the so-called CellGroupConfig, which is a Distributed Unit (DU) configuration (i.e. decided by the baseband unit) in a centralized unit (CU)-DU split architecture, and conveyed to the UE via for example an RRCResume (i.e. during transition from Inactive to Connected) or RRCReconfiguration (e.g. during handovers, intra-cell reconfigurations or transitions from Idle to Connected), as illustrated in FIG. 2B.

The TCI states configurations are signaled as part of the PDSCH configuration, which is configured per each Downlink (DL) Bandwidth Part (BWP) of an special cell (SpCell) (i.e. a primary cell (PCell) or a primary secondary cell (PSCell)), where an SpCell can be comprised of one or multiple DL BWPs. In terms of signaling, this is structured as follows (e.g. for the initial DL BWP case) in FIG. 2C.

The PDSCH configuration (for a given DL BWP) comprising a list of TCI states to be added or modified is tci-StatesToAddModList and tci-StateToReleaseList in the PDSCH Config IE.

A second list of TCI states is configured for PDCCH (also per DL BWP). In the PDCCH-Config there is a list of so-called CORESET (Control Resource Sets), which is the controlResourceSetToAddModList in the PDCCH-Config information element.

Each CORESET contains a length (1, 2, or 3 OFDM (Orthogonal Frequency Division Multiplexing) symbols) as well as a frequency-domain allocation of PDCCH (i.e. where in frequency the PDCCH is transmitted and shall be monitored by the UE). The TCI state configuration indicated which TCI is used to receive the PDCCH candidates transmitted in that CORESET. Each CORESET can have a different TCI state configured/activated, enabling the possibility to use different transmit beams for different PDCCH candidates. In the CORESET configuration (i.e., Control-ResourceSet information element (IE)), there is a pointer (TCI-State ID) to the list of TCI configurations provided in PDSCH and is listed as tci-StatesPDCCH-ToAddList.

Each TCI state configuration contains a pointer, known as TCI State ID (TCI-StateId), which points to the TCI state. That pointer may be used, for example, to refer to a TCI configuration in a CORESET configuration. In other words, the TCI configurations are provided in the PDSCH configuration in a given DL BWP. And, for PDCCH the CORESET configuration contains a TCI state pointer to a configured TCI state in PDSCH.

Each TCI state contains the previously described QCL information, i.e. one or two source downlink reference signals (RS), where each source RS associated with a QCL type. For example, a TCI state contains a pair of reference signals, each associated with a QCL type, e.g. two different CSI-RSs {CSI-RS1, CSI-RS2} is configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e. the Rx beam to use) from CSI-RS2. In terms of RRC signaling, a TCI state is represented by an IE called TCI-State.

Each TCI state contains the previously described QCL information, i.e. one or two source downlink reference signals (RS), where each source RS associated with a QCL type. For example, a TCI state contains a pair of reference signals, each associated with a QCL type, e.g. two different CSI-RSs {CSI-RS1, CSI-RS2} is configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e. the RX beam to use) from CSI-RS2. In terms of RRC signaling, a TCI state is represented by an IE called TCI-State.

As it is shown in the TCI-State IE definition, there is a field called cell. According to the definition in 3GPP TS 38.331, the field called cell in the QCL configuration (i.e. cell field of IE ServCellIndex) is the UE's serving cell in which the Reference Signal that is QCL source is being configured. If the field is absent, it applies to the serving cell in which the TCI-State is configured (i.e. the spCell of the cell group, not an indexed secondary cell (SCell)). The RS can be located on a serving cell other than the serving cell in which the TCI-State is configured only if the qcl-Type is configured as type D (see TS 38.214 section 5.1.5).

TCI state/beam indication/beam switching via MAC CE is discussed below.

Once the UE has been configured with a CellGroupConfig (e.g. in RRCResume, during transition from Inactive to Connected, or in a handover), and spCellConfig with PDSCH and PDCCH configurations per BWP having possible TCI states associated to different transmission downlink beams where these channels need to be detected (or in other words, how the UE should consider its Rx beam to decode these channels), the UE needs to know how the network is providing scheduling information. In other words, all these TCI states that are configured are not considered to be used/monitored all the time. Hence, a signaling efficient activation/deactivation procedure is defined in NR.

The network can activate via MAC CE one TCI state for PDCCH (i.e. provides a TCI for PDCCH) and up to eight active TCI states for PDSCH as illustrated in FIG. 3. In FIG. 3, the gNB transmits CSI-RS in narrow beams to the UE. The UE transmits a measurement message containing measurement results (such as RSRP for the best 1-4 CSI-RS resources. The gNB chooses a CSI-RS resource from the measurements. The gNB knows in which beam transmitted that CSI-RS resource and maps that beam to an SSB. The gNB determines the TCI state S that includes the corresponding SSB index and transmits an activate message that indicates the TCI state(s) S. The number of active TCI states the UE supports is a UE capability, but the maximum is 8.

The MAC CE structure for the activation of UE-specific PDCCH TCI state is given in TS 38.321.

L1/L2 based inter-cell mobility in Rel-17 is discussed below.

In Rel-17, 3GPP is going to standardize what is called so far L1/L2 based inter-cell mobility (or L1-mobility, inter-PCI TCI state change/update/modification, etc.).

A L1/L2 based inter-cell mobility means that a UE receives a L1/L2 signaling (instead of RRC signaling), indicating a TCI state (e.g. for PDCCH) possibly associated to an SSB whose PCI is not necessarily the same as the PCI of the cell the UE has connected to e.g. via connection resume or connection establishment. For example, the L1/L2-centric inter-cell mobility procedure can be interpreted as a beam management operation expanding the coverage of multiple SSBs associated to multiple PCIs (e.g. possibly associated to the same cell or different cells).

SUMMARY

According to some embodiments, a method of operating a UE, configured with a plurality of transmission configurations associated with one or more cells, each cell associated with a frequency includes receiving an indication of a transmission configuration to be activated from the plurality of transmission configurations, the indicated transmission configuration comprising a first frequency that is different from a second frequency of a current transmission configuration. The method includes operating in accordance with the indicated transmission configuration at the first frequency.

Analogous communication devices, computer programs, and computer program products are also provided.

One advantage that may be achieved using the embodiments described herein is the flexibility of triggering a more dynamic load balancing function without the need for radio resource management (RRM) measurements, especially for serving cells and non-serving cells associated to the same gNodeB (gNB).

A method operating a radio access network, RAN, node of a communication network with a plurality of transmission configurations associated with one or more cells, each cell associated with a frequency, includes transmitting an indication of a new TCI state to a communication device (300), wherein the TCI state is associated with a new QCL configuration that is associated with a first frequency that is different than a second frequency associated with a current TCI state. The method includes transmitting and receiving data on the first frequency.

Analogous RAN nodes, computer programs, and computer program products are also provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 2B is an illustration of TCI states configured as part of a CellGroupConfig;

FIG. 3 is a signaling diagram of activating one state for PDCCH and up to eight active TCI states for PDSCH;

FIG. 4 is a block diagram illustrating a wireless UE configured to operate in a wireless communication network according to some embodiments;

FIG. 5 is a block diagram illustrating a radio access network (RAN) node (e.g., a base station eNB/gNB) configured to operate in a wireless communication network according to some embodiments;

DETAILED DESCRIPTION

Figure 1:
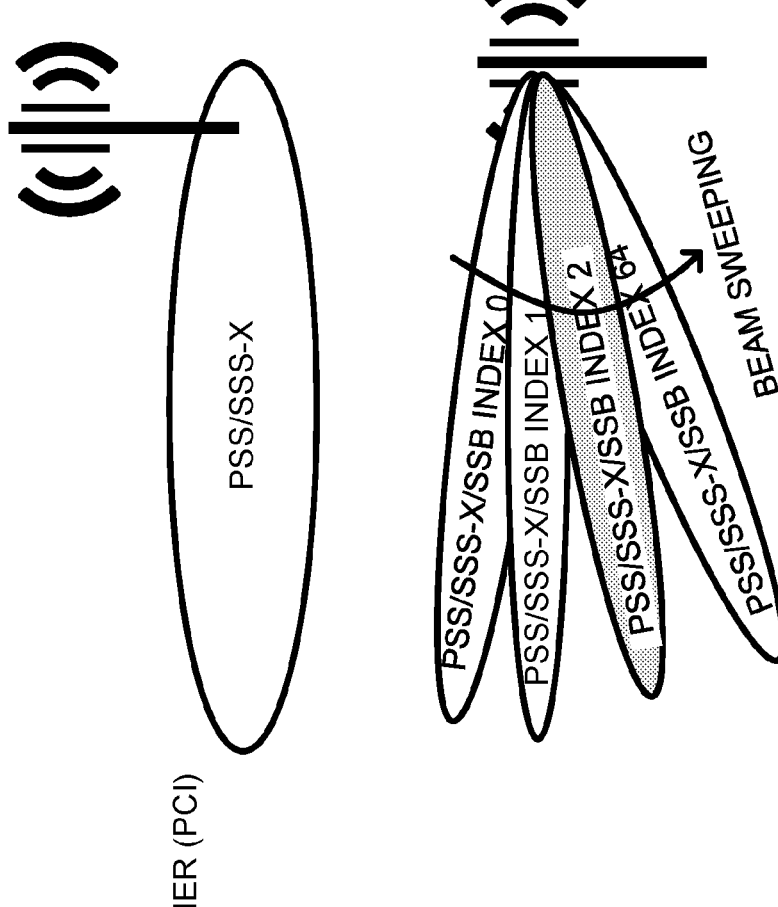
FIG. 1 is an illustration illustrating differences between cell definition in NR and LTE.
Figure 2A:
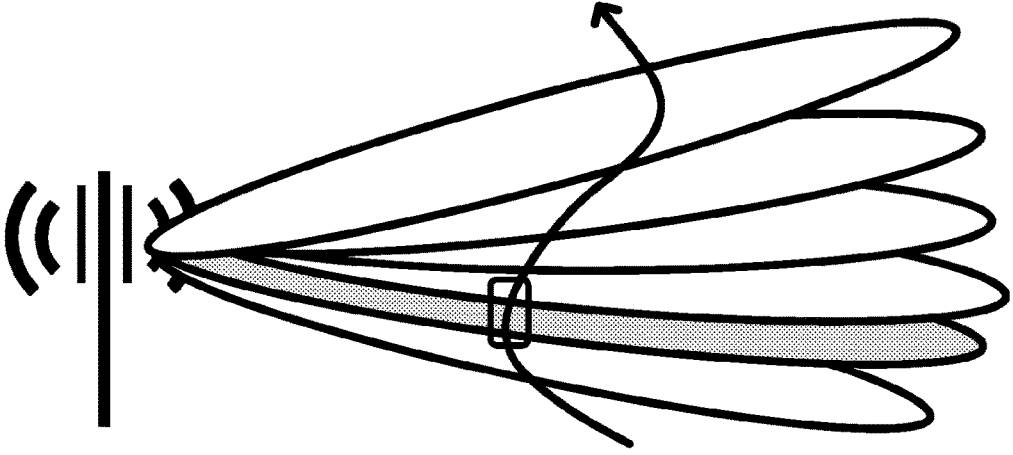
FIG. 2A is an illustration of beam switching within a same cell.
Figure 2C:
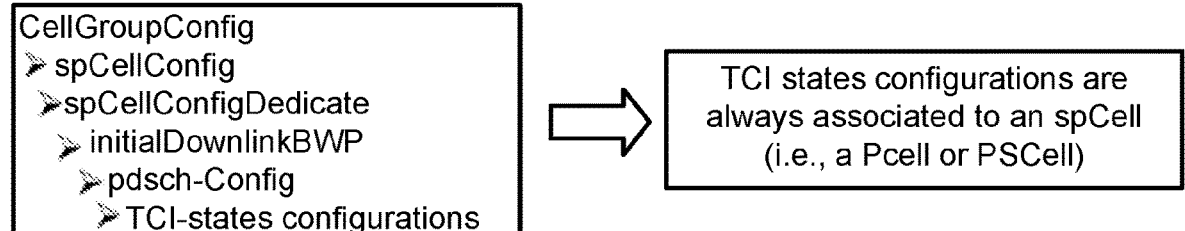
FIG. 2C is an illustration of TCI states signaled in a PDSCH configuration.
Figure 6:
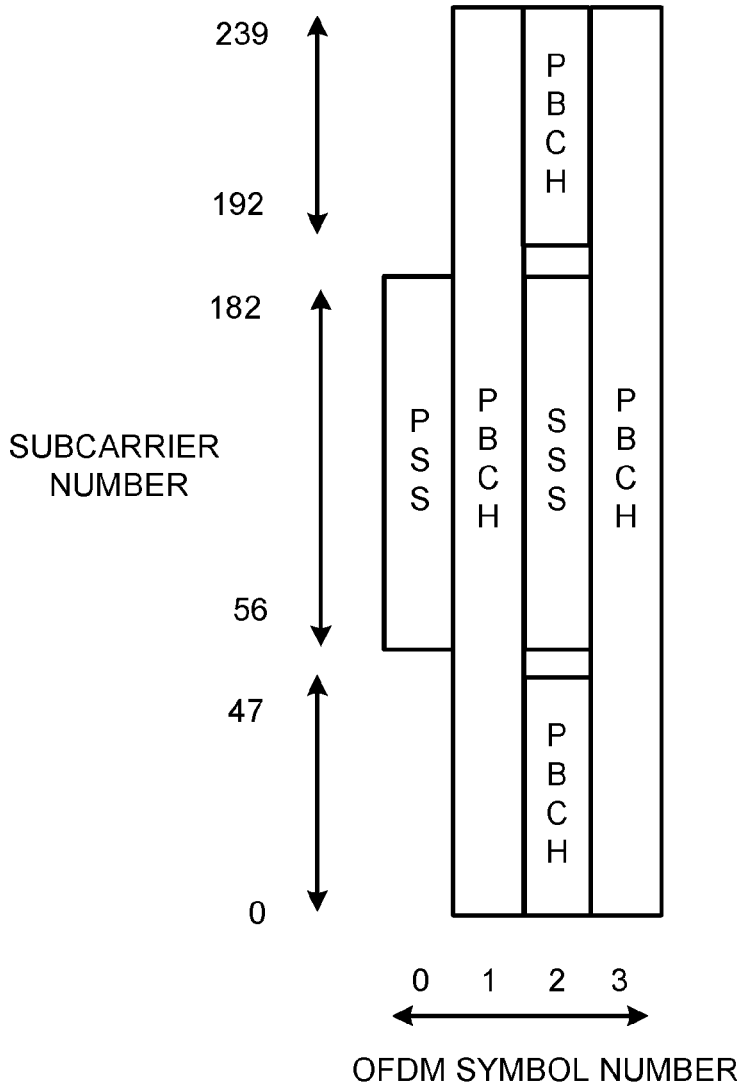
FIG. 6 is an illustration of a PSS and a SSS in an SSB according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

FIG. 4 is a block diagram illustrating elements of a UE 400 (also referred to as a mobile terminal, a mobile communication terminal, a wireless device, a wireless communication device, a wireless terminal, mobile device, a wireless communication terminal, a user equipment node/terminal/device, etc.) configured to provide wireless communication according to embodiments of inventive concepts. As shown, UE may include an antenna 407, and transceiver circuitry 401 (also referred to as a transceiver) including a transmitter and a receiver configured to provide uplink and downlink radio communications with a base station(s) of a radio access network. The UE may also include processing circuitry 403 (also referred to as a processor) coupled to the transceiver circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. The memory can include random access memory (RAM), read-only memory (ROM), storage medium, etc. The storage medium may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium may be configured to include an operating system, one or more application programs such as a web browser application, a widget or gadget engine or another application, and data files. The storage medium may store, for use by UE 400, any of a variety of various operating systems or combinations of operating systems.

According to other embodiments, processing circuitry 403 may be defined to include memory so that separate memory circuitry is not required. The UE may also include an interface (such as a user interface) coupled with processing circuitry 403, and/or the UE may be incorporated in a vehicle.

The interface may be an input/output interface configured to provide a communication interface to an input device, output device, or input and output device. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via an input/output interface to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

As discussed herein, operations of the UE may be performed by processing circuitry 403 and/or transceiver circuitry 401. For example, processing circuitry 403 may control transceiver circuitry 401 to transmit communications through transceiver circuitry 401 over a radio interface to a radio access network node (also referred to as a base station) and/or to receive communications through transceiver circuitry 401 from a RAN node over a radio interface. Processing circuitry 403 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 403 may include two central processing units (CPUs). Data may be information in a form suitable for use by a computer. Moreover, modules may be stored in memory circuitry 405, and these modules may provide instructions so that when instructions of a module are executed by processing circuitry 403, processing circuitry 403 performs respective operations (e.g., operations discussed below with reference to FIG. 7 related to UEs). According to some embodiments, a UE 400 and/or an element(s)/function(s) thereof may be embodied as a virtual node/nodes and/or a virtual machine/machines.

FIG. 5 is a block diagram illustrating elements of a radio access network RAN node 500 (also referred to as a network node, base station, eNodeB/eNB, gNodeB/gNB, etc.) of a Radio Access Network (RAN) configured to provide cellular communication according to various embodiments. As shown, the RAN node 500 may include transceiver circuitry 501 (also referred to as a transceiver) including a transmitter and a receiver configured to provide uplink and downlink radio communications with mobile terminals. The RAN node may include network interface circuitry 507 (also referred to as a network interface) configured to provide communications with other nodes (e.g., with other base stations) of the RAN and/or core network CN. The network node may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 53 may be defined to include memory so that a separate memory circuitry is not required.

The RAN may comprise and/or interface with any type of communication, telecommunication, data, cellular, and/or radio network or other similar type of system. In some embodiments, the RAN may be configured to operate according to specific standards or other types of predefined rules or procedures. Thus, particular embodiments of the RAN may implement communication standards, such as Global System for Mobile Communications (GSM), Universal Mobile Telecommunications System (UMTS), Long Term Evolution (LTE), and/or other suitable 2G, 3G, 4G, or 5G standards; and the like.

As discussed herein, operations of the RAN node may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with reference to FIG. 8 related to RAN nodes). According to some embodiments, RAN node 500 and/or an element(s)/function(s) thereof may be embodied as a virtual node/nodes and/or a virtual machine/machines.

The description herein uses the terminology in the NR specification as main examples and refers to the Rel-17 feature. However, embodiments herein may also be applicable in the context of 6G research, which is often label as Distributed-MIMO (D-MIMO) and cell-less mobility. They may also be relevant for other multi-beam transmission schemes, such as in Tera Hertz communications system, which may be the case in some frequencies possibly allocated to 6G and/or 5G enhancements.

The term "beam" can correspond to a reference signal that is transmitted in a given direction. For example, if may refer to an SS/PBCH Block (SSB) or layer 3 configured CSI-RS in the following sub-section. During a half-frame, different SSBs may be transmitted in different spatial directions (i.e. using different beams, spanning the coverage area of a cell). That can correspond to different SSBs meaning different beams, or that different SSBs being possibly transmitted in different beams so that a beam measurement corresponds to an SSB measurements (e.g. an SS-RSRP).

The term PCI and/or PCI of an SSB is interchangeably used. This corresponds to the physical cell identity encoded by a PSS and a SSS that are comprised in an SSB, as shown in FIG. 10, and as defined in TS 38.211, wherein the PSS and SSS encode a PCI:

The "cells" or a "set of cells" with which the UE 400 can be configured to perform L1/L2 centric mobility may be called a set of intra-frequency neighbour cells the UE 400 can perform measurements on and can perform a handover/reconfiguration with sync to, or a set of intra-frequency non-serving cells or simply a set of non-serving cells. These may be a set of inter-frequency neighbors that are non-serving cells wherein their SSB's frequency location (e.g. SSB ARFCN) are not in the same frequency location as a serving cell SSB frequency location (i.e. different ARFCN).

The terms "CORESET" and "PDCCH" configurations are used interchangeably to indicate a control channel configuration, including an indication of frequency and time locations the UE monitors for scheduling from the network e.g. when it is in Connected state. A CORESET can be defined as a time/frequency control resource set in which to search for downlink control information (see TS 38.213, clause 10.1). The CORESET configuration may be provided to the UE in the IE ControlResourceSet used to configure a time/frequency control resource set (CORESET) in which to search for downlink control information (see TS 38.213, clause 10.1 for further details).

The term L1/L2 based inter-cell mobility or simply L1 mobility or, L1/L2 centric mobility may refer to a procedure where the UE change cells (e.g. changes SpCell, like PCell change or PSCell change) upon reception of a L1 and/or L2 signaling, such as upon the reception of a MAC CE.

Regarding ASN.1 encoding (for the examples showing signaling), consider TS 38.331 Rel-16 specifications for RRC as a reference for the omitted IEs and field in the messages and/or IEs that are proposed to be extended to implement methods disclosed herein according to some embodiments of inventive concepts.

The terms "serving and non-serving cell" have possibly alternative meanings relative to legacy interpretation. This is because of formulation of the work item description for Rel-17 MIMO (multiple input multiple output) which uses the term non-serving cell in an undefined way. For the present disclosure, it may refer to an actual non-serving cell, to a plurality of serving cells configured for the UE that are interpreted differently from carrier aggregation configuration (SCell), or to an additional SSB configured in a serving cell configuration which has different PCI than the cell defining SSB of that serving cell.

The TCI state configuration is provided as part of the PDSCH configuration, in the TCI-State IE, as disclosed in 3GPP TS 38.331 v16.2.0.

The QCL info, e.g., for type D, indicates a RS, either an SSB index or a CSI-RS index that needs to be associated to a cell the UE 400 is configured with. According to the field description in TS 38.331, the QCL-Info IE can include a field cell of IE ServCellIndex that indicates the UE's serving cell in which the RS is configured (if the field is absent, it applies to the serving cell in which the TCI-State is configured). The RS can be located on a serving cell other than the serving cell in which the TCI-State is configured only if the qcl-Type is configured as typeC or typeD.

However, despite the fact that it is possible that the cell associated to the SSB or CSI-RS within the TCI state configuration is not the same cell indicated by the field cell (but a cell within that cell configuration), that still needs to be a serving cell, for which in current specifications the UE 400 has a ServingCellConfigCommon associated (provided as part of the SpCell configuration, or obtained via system information acquisition or provided as part of an SCell configuration). In other words, the current signaling is not suitable for an inter-frequency TCI state configuration if the cell associated to the RS in QCL-Info is a non-serving cell, in particular if that cell is in another frequency.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 7:
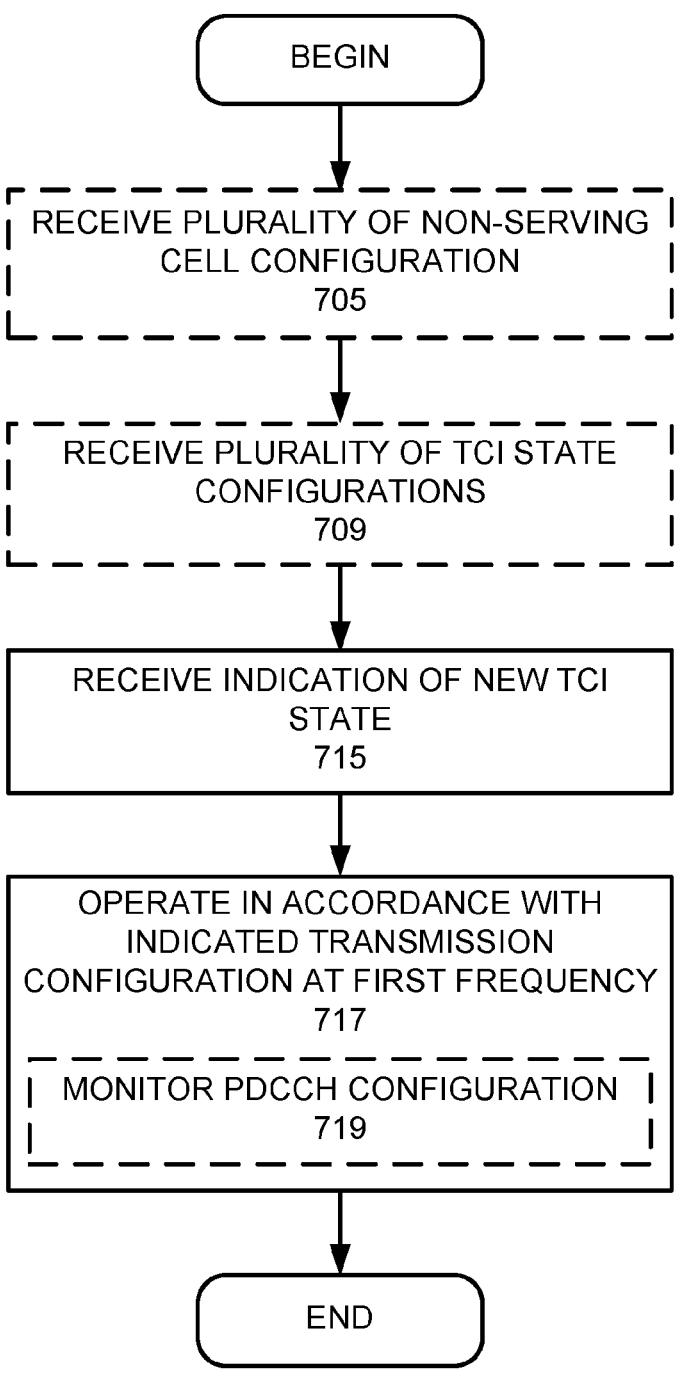
FIG. 7 is a flow chart illustrating operations of a communication device according to some embodiments.

According to some embodiments, a method at a wireless terminal (UE) 400 is provided, the method includes blocks 705-719 of FIG. 7. Operations of the UE 400 (implemented using the structure of the block diagram of FIG. 4) will be discussed below with reference to the flow chart of FIG. 7 according to some embodiments of inventive concepts. For example, modules may be stored in memory 405 of FIG. 4, and these modules may provide instructions so that when the instructions of a module are executed by respective communication device processing circuitry 403, processing circuitry 303 and UE 400 perform respective operations of the flow chart.

Various operations from the flow chart of FIG. 7 may be optional with respect to some embodiments of UEs and related methods.

In block 705, the method may include the UE 400 obtaining a plurality of transmission configurations (e.g., non-serving cell configuration(s) for at least one non-serving cell), where each of the plurality of transmission configurations indicates a respective frequency of the respective cell and/or a respective cell reference of the respective cell. Each transmission configuration can be used to configure a non-serving cell for L1/L2 based inter-cell mobility and may contain an identity (e.g., PCI) of the non-serving cell and frequency information. As an example, the UE 400 may receive the plurality of transmission configurations from the network node.

In some embodiments, the non-serving cell configuration contains a non-serving cell SSB frequency, and the SS/PBCH Block (SSB) frequency of the at least one non-serving cell is in a different frequency than the frequency of the serving cell's SSB.

The non-serving cell configuration can also contain a non-serving cell reference. The non-serving cell reference can correspond to an integer i. Alternatively, the non-serving cell reference can correspond to a non-serving cell index, which may be an integer, that can be later referred to in another configuration, such as a TCI state configuration. The cell reference can also correspond to the combination of PCI and the SSB frequency location (e.g. ARFCN).

In block 709, the method may include the UE 400 receiving from the network a plurality of TCI state configurations. In some embodiments, at least one of the TCI states is associated to a QCL source associated to a non-serving cell. For example, the association can be done by the QCL configuration containing the non-serving cell reference, e.g. a non-serving cell index. The association can be also done by the QCL configuration containing an identification of a frequency (e.g. Measurement Object Id) and the PCI, so the UE knows that the QCL of a configured TCI state is associated to a PCI to be searched/synchronized in a frequency as indicated by the identification of a frequency and/or further frequency-specific configuration associated.

In some embodiments, at least one of the TCI states is associated to a TCI state identifier.

In block 715, the method includes the UE 400 receiving from the network an indication of a transmission configuration to be activated from the plurality of transmission configurations, the indicated transmission configuration comprising a first frequency that is different from a second frequency of a current transmission configuration. In some embodiments, the UE receives the indication of the transmission configuration by receiving an indication of a TCI state among the plurality of TCI states, the indicated TCI state being associated with a QCL configuration that is associated with the first frequency. The indicated TCI state may be referred to as the new TCI state, which, when activated, replaces the current TCI state.

The receiving may be in the form of a L1/L2 signaling indicating a new TCI state to the UE 400, wherein the QCL source of that new TCI state is associated to an SSB that is in a different frequency location than the SSB associated to the current TCI state.

In some embodiments, a L1/L2 signaling may correspond to a MAC CE including a TCI state identifier. The TCI identifier can correspond to one of the TCI state identifiers the UE is configured with, for example.

In block 717, the method includes operating in accordance with the indicated transmission configuration at the first frequency.

Block 719 illustrates an embodiment of operating in accordance with the indicated transmission configuration at the first frequency, e.g. the UE 400 can monitor a PDCCH configuration (e.g. CORESET) associated to the new TCI (which shall be referred to as the configuration reference). This configuration reference can correspond to an integer. This configuration reference can correspond to a non-serving cell index, which may be an integer. This could be called a virtual cell index. In the example shown later, this is a field nsCellIndex of IE NSCellIndex, which may be defined as an integer. That configuration reference can correspond to the combination of PCI and the SSB frequency location (e.g. ARFCN) e.g. the center frequency of an SSB (the frequency referring to the position of resource element RE=#0 (subcarrier #0) of resource block RB#10 of the SS block);

In some other embodiments, the received configuration of the at least one non-serving cell contains a non-serving cell SS/PBCH Block (SSB) frequency and the SSB frequency of the at least one non-serving cell is in a different frequency than the frequency of the serving cell's SSB.

The network can correspond to a network node, like a gNodeB in a Next Generation Radio Access Network (NG-RAN).

The serving cell can correspond to a PCell, or a PSCell, or an SpCell, or an SCell of the SCG, or an SCell of the MCG (according to definitions of TS 38.331). In more details, for a UE in RRC_CONNECTED not configured with Carrier Aggregation (CA)/Dual Connectivity (DC) there can be one serving cell comprising of the primary cell. For a UE in RRC_CONNECTED configured with CA/DC the term 'serving cells' is used to denote the set of cells comprising of the Special Cell(s)—SpCell(s) and all secondary cells.

The UE can receive the plurality of non-serving cell configuration(s) for at least one non-serving cell in a dedicated signaling. That dedicated signaling can correspond to a list of IEs ServingCellConfigCommon(s) included in an RRC message e.g. an RRCReconfiguration. The ServingCellConfigCommon(s) may include physical random access channel (PRACH) configuration and paging configuration per nonserving cell for access and paging purposes. According to the method, the ServingCellConfigCommon IE is extended to configure a non-serving cell for the purpose of L1/L2 inter-cell centric mobility. For example, in addition to the existing information in ServingCellConfigCommon(s), Cell-radio network temporary identifier (C-RNTI) and SSB measurement timing configuration (SMTC) information may be added. Either within the IE ServingCellConfigCommon(s) or as in the below example.

An example of that list, labeled here a list of non-serving cells (acronym NSC) is shown below in Table 1:

TABLE 1

```
nsCellToAddModList SEQUENCE (SIZE (1..maxNrofNSCells)) OF NSCellConfig
NSCellConfig ::=          SEQUENCE {
   nsCellIndex              NSCellIndex,
   nsCellConfigCommon       ServingCellConfigCommon    OPTIONAL,
   sCellConfigDedicated     ServingCellConfig   OPTIONAL, -- Cond SCellAddMod
   nsCell-smtc              SSB-MTC                  OPTIONAL, -- Need S
   c-RNTI                   C-RNTI                   OPTIONAL -- Need R
}
``` state, i.e. according to the new QCL source in the SSB located in the different frequency. Other examples may comprise the UE transmitting and receiving data according to the indicated transmission configuration at the first frequency.

Block 705

In some embodiments, the received configuration contains a non-serving cell reference/indication/pointer/index According to the method, the ServingCellConfigCommon IE used to configure a non-serving cell for the purpose of L1/L2 inter-cell centric mobility, contains the PCI of the non-serving cell (field physCellId of IE PhysCellId) and the downlink frequency information of the non-serving cell (field downlinkConfigCommon of IE DownlinkConfigCommon). The non-serving cell configuration can also be associated to a reference, which in the example above can be the non-serving cell index (e.g. field nsCellIndex of IE NSCel-lIndex, which can be an integer to be later referred in another configuration, such as in the TCI state configuration and/or within a list of TCI state configurations).

This is the cell information the UE 400 uses for synchro-nizing with an SSB (and/or CSI-RS) associated to a given non-serving cell upon reception of a MAC CE indicating an SSB associated to the non-serving cell (associated to the non-serving cell reference, in this example a non-serving cell index which is an index associated to the non-serving cell configuration i.e. ServingCellConfigCommon). In more general terms, other SSB properties associated to the SSB(s) of the non-serving cell is also provided as part of the ServingCellConfigCommon and are to be considered by the UE 400 upon reception of the MAC CE indicating a TCI state whose QCL source is associated to that non-serving cell. This MAC CE may be for updating TCI state for PDCCH, PDSCH, PUSCH or PUCCH. When UE 400 receives the MAC CE (which ever) and moves, the UE action is to apply ALL RRC configurations associated to that respective non-serving cell.

What is called the non-serving cell reference above can correspond to the field nsCellIndex of IE NSCellIndex, which can be an integer from 0 to a Max value (e.g. 8), depending on the maximum number of non-serving cells that can be configured for L1/L2 centric mobility.

This is shown as follows:

ServingCellConfigCommon

The IE ServingCellConfigCommon is used to configure cell specific parameters of a UE's serving cell. The IE contains parameters which a UE would typically acquire from SSB, MIB or system information blocks (SIBs) when accessing the cell from IDLE. With this IE, the network provides this information in dedicated signalling when con-figuring a UE with a SCells, or with an additional cell group (SCG), or with non-serving cells that can be accessed via L1/L2 inter-cell centric mobility. It also provides it for SpCells (MCG and SCG) upon reconfiguration with sync.

The ServingCellConfigCommon information element and related field descriptions are illustrated in Tables 2 and 3.

TABLES 2 and 3

```
-- ASN1START
-- TAG-SERVINGCELLCONFIGCOMMON-START
ServingCellConfigCommon ::=          SEQUENCE {
    physCellId                         PhysCellId              OPTIONAL, -- Cond
HOAndServCellAdd,
    downlinkConfigCommon               DownlinkConfigCommon OPTIONAL, -- Cond
HOAndServCellAdd
[. . .]
    ssb-PositionsInBurst       CHOICE {
        shortBitmap                    BIT STRING (SIZE (4)),
        mediumBitmap                   BIT STRING (SIZE (8)),
        longBitmap                     BIT STRING (SIZE (64))
    } OPTIONAL, -- Cond AbsFreqSSB
    ssb-periodicityServingCell         ENUMERATED { ms5, ms10, ms20, ms40, ms80,
ms160, spare2, spare1 }    OPTIONAL, -- Need S
[. . .]
    ssbSubcarrierSpacing               SubcarrierSpacing   OPTIONAL, -- Cond
HOAndServCellWithSSB
[. . .]
    ssb-PositionQCL-r16                 SSB-PositionQCL-Relation-r16   OPTIONAL, --
Cond SharedSpectrum
[. . .]
}
-- TAG-SERVINGCELLCONFIGCOMMON-STOP
-- ASN1STOP
```

| ServingCellConfigCommon field descriptions |
| --- |
| downlinkConfigCommon |
| The common downlink configuration of the serving cell, including the frequency information configuration and the initial downlink BWP common configuration. The parameters provided herein should match the parameters configured by MIB and SIB1 (if provided) of the serving cell, with the exception of controlResourceSetZero and searchSpaceZero which can be configured in ServingCellConfigCommon even if MIB indicates that they are absent. This can also be the common downlink configuration of a non-serving cell provided in dedicated signalling for L1/L2 centric mobility. |
| discoveryBurst Window Length |
| Indicates the window length of the discovery burst in ms (see TS 37.213 [48]). This can also be applicable for a non-serving cell provided in dedicated signalling for L1/L2 centric mobility. |
| ssb-periodicityServingCell |
| The SSB periodicity in ms for the rate matching purpose. If the field is absent, the UE applies the value ms5. (see TS 38.213 [13], clause 4.1) This can also be applicable for a non-serving cell provided in dedicated signalling for L1/L2 centric mobility. |
| ssb-PositionQCL |
| Indicates the QCL relationship between SSB positions for this serving cell as specified in TS 38.213 [13], clause 4.1. This can also be applicable for a non-serving cell provided in dedicated signalling for L1/L2 centric mobility. |
| ssb-PositionsInBurst |
| For operation in licensed spectrum, indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding |

US 12,580,629 B2

15                                                      16

TABLES 2 and 3-continued

SS/PBCH block is transmitted. The network configures the same pattern in this field as in the corresponding field in ServingCellConfigCommonSIB.
For operation with shared spectrum channel access, only mediumBitmap is used and the UE assumes that one or more SS/PBCH blocks indicated by ssb-PositionsInBurst may be transmitted within the discovery burst transmission window and have candidate SS/PBCH blocks indexes corresponding to SS/PBCH block indexes provided by ssb-PositionsInBurst (see TS 38.213 [13], clause 4.1). If the k-th bit of ssb-PositionsInBurst is set to 1, the UE assumes that one or more SS/PBCH blocks within the discovery burst transmission window with candidate SS/PBCH block indexes corresponding to SS/PBCH block index equal to k − 1 may be transmitted; if the kt-th bit is set to 0, the UE assumes that the corresponding SS/PBCH block(s) are not transmitted. If ssb-PositionQCL is configured, the UE expects that the k-th bit is set to 0, where k > ssb-PositionQCL and the number of actually transmitted SS/PBCH blocks is not larger than the number of 1's in the bitmap. The network configures the same pattern in this field as in the corresponding field in ServingCellConfigCommonSIB. This can also be applicable for a non-serving cell provided in dedicated signalling for L1/L2 centric mobility.
ssbSubcarrierSpacing
Subcarrier spacing of SSB. Only the values 15 kHz or 30 kHz (FR1), and 120 kHz or 240 kHz (FR2) are applicable. This can also be applicable for a non-serving cell provided in dedicated signalling for L1/L2 centric mobility.

[ . . . ]
DownlinkConfigCommon
   The IE DownlinkConfigCommon provides common downlink parameters of a cell (which may be a serving cell or a non-serving cell configured for L1/L2 centric mobility).
   The DownlinkConfigCommon information element and related field descriptions are illustrated in Tables 4 and 5.

TABLE 4

```
-- ASN1START
-- TAG-DOWNLINKCONFIGCOMMON-START
DownlinkConfigCommon ::=         SEQUENCE {
   frequency InfoDL          FrequencyInfoDL     OPTIONAL, --
Cond InterFreqHOAndServCellAdd
   initialDownlinkBWP        BWP-                OPTIONAL, --
                             DownlinkCommon
Cond ServCellAdd
   . . .
}
-- TAG-DOWNLINKCONFIGCOMMON-STOP
-- ASN1STOP
```

TABLE 5

DownlinkConfigCommon field descriptions frequencyInfoDL
Basic parameters of a downlink carrier and transmission thereon.
initialDownlinkBWP
The initial downlink BWP configuration for a serving cell or for a non-serving cell configured for L1/L2 centric mobility. The network configures the locationAndBandwidth so that the initial downlink BWP contains the entire CORESET#0 of this serving cell in the frequency domain.

[ . . . ]
FrequencyInfoDL
   The IE FrequencyInfoDL provides basic parameters of a downlink carrier and transmission thereon.
   The FrequencyInfoDL information element related field descriptions are illustrated in Tables 6 and 7.

TABLE 7

```
-- ASN1START
-- TAG-FREQUENCYINFODL-START
Frequency InfoDL ::=      SEQUENCE {
   absoluteFrequencySSB        ARFCN-ValueNR      OPTIONAL, --
Cond SpCellAdd
```

TABLE 7-continued

```
   frequencyBandList        MultiFrequencyBandListNR,
   absoluteFrequencyPointA    ARFCN-ValueNR,
   scs-SpecificCarrierList    SEQUENCE (SIZE (1..maxSCSs))
                             OF SCS-
SpecificCarrier,
   . . .
}
-- TAG-FREQUENCYINFODL-STOP
-- ASN1STOP
```

US 12,580,629 B2

TABLE 7

FrequencyInfoDL field descriptions absoluteFrequencyPointA
Absolute frequency position of the reference resource block (Common RB 0). Its lowest
subcarrier is also known as Point A (see TS 38.211 [16], clause 4.4.4.2). Note that the lower
edge of the actual carrier is not defined by this field but rather in the scs-
SpecificCarrierList.
absoluteFrequencySSB
Frequency of the SSB to be used for this serving cell (or for a non-serving cell configured
for L1/L2 centric mobility). SSB related parameters (e.g. SSB index) provided for a serving
cell (or for a non-serving cell configured for L1/L2 centric mobility) refer to this SSB
frequency unless mentioned otherwise. The cell-defining SSB of the PCell is always on the
sync raster. Frequencies are considered to be on the sync raster if they are also identifiable
with a GSCN value (see TS 38.101-1 [15]). If the field is absent, the SSB related parameters
should be absent, e.g. ssb-PositionsInBurst, ssb-periodicityServingCell and
subcarrierSpacing in ServingCellConfigCommon IE. If the field is absent, the UE obtains
timing reference from the SpCell. This is only supported in case the SCell is in the same
frequency band as the SpCell.
frequencyBandList
List containing only one frequency band to which this carrier(s) belongs. Multiple values
are not supported.
scs-SpecificCarrierList
A set of carriers for different subcarrier spacings (numerologies). Defined in relation to
Point A. The network configures a scs-SpecificCarrier at least for each numerology (SCS)
that is used e.g. in a BWP (see TS 38.211 [16], clause 5.3).

According to some embodiments, the SSB frequency indicated in the FrequencyInfoDL of the non-serving cell (e.g. by the field absoluteFrequencySSB of IE ARFCN-ValueNR) is the frequency wherein the UE 400 searches the SSB associated to the configured non-serving cells. In other words, this is the frequency where the UE 400 should search the PCI for the non-serving cell, upon reception of the MAC CE wherein the TCI state indicated in the MAC CE has a QCL source associated to that non-serving cell. That frequency does not have to be the same indicated for the SpCell (or any of the Serving Cells e.g. MCG SCells). The ARFCN for the SSB of the Non-Serving Cell can be different from the ARFCN of a serving cell (as configured in ServingCellConfigCommon SIB for the SpCell and/or as obtained via system information).

Further enhancements can be considered, for example, in terms of signaling. For example, if the downlink frequency information is absent in the non-serving cell configuration, the UE 400 considers the downlink frequency information of the non-serving cell to be the same frequency as the serving cell, e.g. to have the same frequency information as the SpCell and/or an SCell of the corresponding cell group. That can be used to save signaling in case the non-serving cell is an intra-frequency neighbour, for intra-frequency L1/L2 centric mobility.

The plurality of non-serving cell configurations can be organized in a set of configuration and/or a list of configurations, such as AddMod list structure (where the same IE is used for adding and/or modifying a configuration), and there could also be a list for removing non-serving cell configuration(s).

The plurality of non-serving cell configurations can be configured within different IEs in an RRCReconfiguration message, such as at least one of the following:

In one example, the list of non-serving cell configuration(s) is within the cell group configuration (e.g. Master Cell Group (MCG) configuration) i.e. within the IE CellGroupConfig illustrated in Table 8.

TABLE 8

| | |
|---|---|
| CellGroupConfig ::= | SEQUENCE { |
| cellGroupId | CellGroupId, |
| [. . .] | |
| spCellConfig | SpCellConfig |
| OPTIONAL, -- Need M | SEQUENCE (SIZE (1..maxNrofSCells)) |
| | OF SCellConfig |
| sCellToAddModList | |
| OPTIONAL, -- Need N | |
| nsCellToAddModList | |
| | SEQUENCE (SIZE (1..maxNrofNSCells)) OF NSCellConfig |
| [. . .] | |
| } | |

In one example, the list of non-serving cell configuration(s) is outside the cell group configuration (e.g. MCG configuration), as a way to indicate that upon L1/L2 inter-cell mobility the UE is changing SpCell, which might be leading to a change in cell group as shown in Table 9. There could be additional cell groups, wherein each SpCell associated to that cell group is a candidate for L1/L2 inter-cell mobility.

TABLE 9

| | |
|---|---|
| -- ASN1START | |
| -- TAG-RRCRECONFIGURATION-START | |
| RRCReconfiguration ::= | SEQUENCE { |
| rrc-TransactionIdentifier | RRC-TransactionIdentifier, |
| criticalExtensions | CHOICE { |
| rrcReconfiguration | RRCReconfiguration-IEs, |
| criticalExtensionsFuture | SEQUENCE { } |
| } | |
| } | |
| [. . .] | |

TABLE 9-continued

```
RRCReconfiguration-v17-IEs ::=        SEQUENCE {
    masterCellGroup              OCTET STRING (CONTAINING CellGroupConfig)
OPTIONAL, -- Need M
        nsCellToAddModList SEQUENCE (SIZE (1..maxNrofNSCells)) OF
NSCellConfig
[. . .]
}
-- TAG-RRCRECONFIGURATION-STOP
-- ASN1STOP
```

The non-serving cell can be considered as an inter-frequency neighbour of the serving cell (as the SSBs of these cells are not in the same frequency location, i.e., the ServingCellConfigCommon of the serving cell and the Serving-CellConfigCommon of the non-serving cell have different SSB's ARFCN).

The frequency information for non-serving cells can comprise frequency information in addition to the SSB frequency, such as:

The frequency band list, e.g. field frequencyBandList of IE MultiFrequencyBandListNR, to define the list containing only one frequency band to which this carrier(s) for the non-serving cell for L1/L2 mobility belongs;

The Point A frequency, e.g. the field absoluteFrequency-PointA of ARFCN-ValueNR, which is defined as the absolute frequency position of the reference resource block (Common RB 0) for that non-serving cell supporting L1/L2 centric mobility;

A set of carriers for different subcarrier spacings (numerologies), defined in relation to Point A.

In one embodiment, the frequency information for an SSB associated to a non-serving cell in a frequency that is not a serving frequency is provided in one of the configured measurement object(s) associated to a measurement object identifier (that may later be referred in the signaling to indicate a frequency) e.g. as provided in the MeasConfig IE, as shown in Table 10. Therein some properties of these non-serving cell SSBs can be the SSB frequency information (field ssbFrequency of IE ARFCN-ValueNR), the SSB subcarrier spacing, the frequency-specific SMTC and/or further cell specific SMTC, frequency band indicator, etc.

TABLE 10

| MeasObjectNR ::= | SEQUENCE { | |
|---|---|---|
| ssbFrequency | ARFCN-ValueNR | |
| OPTIONAL, -- Cond SSBorAssociatedSSB | | |
| ssbSubcarrierSpacing | SubcarrierSpacing | |
| OPTIONAL, -- Cond SSBorAssociatedSSB | | |
| smtc1 | SSB-MTC | OPTIONAL, -- |
| Cond SSBorAssociatedSSB | | |
| smtc2 | SSB-MTC2 | OPTIONAL, -- |
| Cond IntraFreqConnected | | |
| refFreqCSI-RS | ARFCN-ValueNR | |
| OPTIONAL, -- Cond CSI-RS | | |

TABLE 10-continued

| referenceSignalConfig | ReferenceSignalConfig, |
|---|---|
| [. . .] | |
| freqBandIndicatorNR | FreqBandIndicatorNR |
| OPTIONAL, -- Need R | |
| [. . .] | |
| } | |

In that case, the UE obtains the ServingCellConfigCommon via system information acquisition, after the L1/L2 mobility signaling is received e.g. upon reception of the MAC CE.

Block 709

In some embodiments, at least one of the TCI states is associated to a QCL source associated to a non-serving cell. The association can be done by the QCL configuration containing the non-serving cell reference, e.g. a non-serving cell index. Via the index it would be possible for the UE to derive the frequency information (e.g. SSB frequency) and the PCI for the indicated non-serving cell.

In some examples, the non-serving cell is an inter-frequency neighbour e.g. the SSB Frequency of the neighbour cell and/or the subcarrier spacing is different than the values for the serving cell. In other examples, the non-serving cell has an SSB in a frequency location (e.g. ARFCN) that is a different frequency location of the SSB of a serving cell.

The association can be done by the QCL configuration containing an identification of a frequency (e.g. Measurement Object Id) and the PCI, so the UE knows that the QCL of a configured TCI state is associated to a PCI to be searched/synchronized in a frequency as indicated by the identification of a frequency and/or further frequency-specific configuration associated such as at least one of the TCI states is associated to TCI state identifier;

There could be different solutions to associate the TCI state with a QCL source that has a reference signal (e.g. SSB and/or CSI-RS) of a non-serving cell possibly in a different frequency than the SSB frequency of the serving cell (e.g. the PCell or PSCell).

In one approach, the QCL information configuration of a TCI state configuration contains a reference/pointer to the cell the reference signal indicated is associated to, wherein the reference/pointer is the PCI and ARFCN of the non-serving cell, as follows in Tables 11 and 12:

TABLE 11

```
-- ASN1START
-- TAG-TCI-STATE-START
TCI-State ::=            SEQUENCE {
    tci-StateId            TCI-StateId,
    qcl-Type1              QCL-Info,
    qcl-Type2              QCL-Info            OPTIONAL, -- Need R
    . . .
}
QCL-Info ::=             SEQUENCE {
    cell                   ServCellIndex       OPTIONAL, -- Need R
```

TABLE 11-continued

```
physCellId               PhysCellId              OPTIONAL
downlinkConfigCommon     DownlinkConfigCommon    OPTIONAL,
bwp-Id                   BWP-Id                  OPTIONAL, -- Cond CSI-RS-Indicated
referenceSignal          CHOICE {
   csi-rs                   NZP-CSI-RS-ResourceId,
   ssb                      SSB-Index
},
qcl-Type                 ENUMERATED {typeA, typeB, typeC, typeD},
. . .
}
-- TAG-TCI-STATE-STOP
-- ASN1STOP
```

TABLE 12

QCL-Info field descriptions bwp-Id
The DL BWP which the RS is located in.
cell
The UE's serving cell in which the referenceSignal is configured. If the field is absent, it
applies to the serving cell in which the TCI-State is configured. The RS can be located on a
serving cell other than the serving cell in which the TCI-State is configured only if the qcl-
Type is configured as typeC or typeD. See TS 38.214 [19] clause 5.1.5. if the TCI state is
associated to a non-serving cell, this field is absent.
referenceSignal
Reference signal with which quasi-collocation information is provided as specified in TS
38.214 [19] subclause 5.1.5.
qcl-Type
QCL type as specified in TS 38.214 [19] subclause 5.1.5.
physCellId
PCI of a non-serving cell in which the referenceSignal is configured. The field is absent if
the referenceSignal is configured for a serving cell.
downlinkConfigCommon
Downlink frequency information of a non-serving cell in which the referenceSignal is
configured.

Further properties on how to search the SSBs e.g. SMTC, SSB positions in burst could be found in the configured measurement object with same ARFCN for the SSB the UE is configured with e.g. in MeasConfig IE.

In another solution, the QCL information configuration of a TCI state configuration contains a reference/pointer to the cell the reference signal indicated is associated to, wherein the reference/pointer is a non-serving cell index, as follows in Tables 13A, 13B, and 14:

TABLE 13A

```
-- ASN1START
-- TAG-TCI-STATE-START
TCI-State ::=         SEQUENCE {
   tci-StateId          TCI-StateId,
   qcl-Type1            QCL-Info,
   qcl-Type2            QCL-Info        OPTIONAL, -- Need R
```

TABLE 13A-continued

```
. . .
}
QCL-Info ::=          SEQUENCE {
   cell                 ServCellIndex       OPTIONAL, -- Need R
   nsCellIndex          NSCellIndex,
   bwp-Id               BWP-Id              OPTIONAL,
                                            -- Cond CSI-RS-Indicated
   referenceSignal      CHOICE {
      csi-rs               NZP-CSI-RS-ResourceId,
      ssb                  SSB-Index
   },
   qcl-Type             ENUMERATED {typeA, typeB, typeC, typeD},
   . . .
}
-- TAG-TCI-STATE-STOP
-- ASN1STOP
```

TABLE 13B

```
// Non-serving cell configurations
nsCellToAddModList SEQUENCE (SIZE (1..maxNrofNSCells)) OF NSCellConfig
NSCellConfig ::=          SEQUENCE {
   nsCellIndex              NSCellIndex,
   nsCellConfigCommon       ServingCellConfigCommon    OPTIONAL,
}
[. . .]
```

TABLE 14

| QCL-Info field descriptions |
| --- |
| bwp-Id |
| The DL BWP which the RS is located in. |
| cell |
| The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5. if the TCI state is associated to a non-serving cell, this field is absent. |
| referenceSignal |
| Reference signal with which quasi-collocation information is provided as specified in TS 38.214 [19] subclause 5.1.5. |
| qcl-Type |
| QCL type as specified in TS 38.214 [19] subclause 5.1.5. |
| nsCellIndex |
| Non-serving cell in which the referenceSignal is configured. The index is associated to a non-serving cell configuration i.e. a ServingCellConfigCommon. |

In another approach, relying on that the QCL information of a TCI state configuration can be associated to a non-serving cell (e.g. an inter-frequency neighbour) and that multiple TCI states could be associated to the same non-serving cell, for each non-serving cell reference/pointer there can be a list of TCI states configuration(s), as follows in Table 15:

TABLE 15

```
PDSCH-Config ::=              SEQUENCE {
[. . .]
// legacy TCI state configuration for serving cell(s)
    tci-StatesToAddModList           SEQUENCE (SIZE(1..maxNrofTCI-States)) OF TCI-
State OPTIONAL, -- Need N
[. . .]
// TCI state configuration for non-serving cell(s)
    tci-StatesToAddModList-NSC         SEQUENCE (SIZE(1..maxNrof-NSC)) OF TCI-
State-NSC OPTIONAL,
TCI-State-NSC    ::=          SEQUENCE {
    nsCellIndex                 NSCellIndex,
    tci-StatesToAddModList           SEQUENCE (SIZE(1..maxNrofTCI-States)) OF
TCI-State
}
}
}
```

Hence, any TCI state has as QCL source a reference signal associated to the non-serving cell associated to that index e.g. nsCellIndex. Let's assume an example where 4 TCI states are associated to 2 non-serving cells e.g. TCI=1 and TCI=2 with non-serving cell A whose non-serving cell index=7, and TCI=3 and TCI=4 with non-serving cell B, whose non-serving cell index=13. In this case, the PDSCH configuration (or any other IE containing TCI state configuration(s)) can contain within tci-StatesToAddModList-NSC the following:

TCI-State-NSC(1), for non-serving cell A;
      nsCellIndex=7
      TCI=1 and TCI=2 with reference signals in QCL source associated to cell A, indexed by nsCellIndex=7;
    TCI-State-NSC(2), for non-serving cell B;

nsCellIndex=13
      TCI=3 and TCI=4 with reference signals in QCL source associated to non-serving cell B, indexed by nsCel-lIndex=13;

That saves downlink signaling in the sense that multiple TCI states have as QCL source reference signals associated to the same non-serving cell, which may be a common scenario. More TCI states are associated to the same non-serving cell (QCL reference signal associated to that non-serving cell) more relevant the signaling optimization is compared to the previous case where the non-serving cell reference would be possibly repeated for every TCI state configuration/QCL info configuration.

In another approach, relying on that the QCL information of a TCI state configuration can be associated to a non-serving cell (e.g. an inter-frequency neighbour) and that multiple TCI states could be associated to the same non-serving cell, for each non-serving cell reference/pointer there can be a list of TCI states configuration(s), wherein the reference/point is the PCI and the ARFCN, as follows in Table 16:

TABLE 16

```
PDSCH-Config ::=              SEQUENCE {
[. . .]
// legacy TCI state configuration for serving cell(s)
    tci-StatesToAddModList           SEQUENCE (SIZE(1..maxNrofTCI-States)) OF TCI-
State OPTIONAL, -- Need N
[. . .]
// TCI state configuration for non-serving cell(s)
```

TABLE 16-continued

```
tci-StatesToAddModList-NSC        SEQUENCE (SIZE(1..maxNrof-NSC)) OF TCI-
State-NSC OPTIONAL,
TCI-State-NSC    ::=         SEQUENCE {
  physCellId              PhysCellId      OPTIONAL
  downlinkConfigCommon    DownlinkConfigCommon    OPTIONAL,
  tci-StatesToAddModList            SEQUENCE (SIZE(1..maxNrofTCI-States)) OF TCI-
State
}
}
```

Hence, any TCI state has as QCL source a reference signal associated to the non-serving cell associated to the non-serving cell PCI and the non-serving cell downlink frequency information configuration (that contains the SSB ARFCN). Let's assume an example where 4 TCI states are associated to 2 non-serving cells e.g. TCI=1 and TCI=2 with non-serving cell A whose non-serving cell PCI=5 and ARFCN=X, and TCI=3 and TCI=4 with non-serving cell B, whose non-serving cell PCI=13 and ARFCN=Y. In this case, the PDSCH configuration (or any other IE containing TCI state configuration(s)) can contain within tci-StatesToAddModList-NSC the following:

TCI-State-NSC(1), for non-serving cell A;
    PCI=5 and ARFCN=X;
    TCI=1 and TCI=2 with reference signals in QCL source associated to cell A;
TCI-State-NSC(2), for non-serving cell B;
    PCI=13 and ARFCN=Y;
    TCI=3 and TCI=4 with reference signals in QCL source associated to non-serving cell B;

To give an idea of the signaling gain, without the structure above the following would have been received by the UE (twice as long):

TCI-State-NSC(1), for non-serving cell A;
    PCI=5 and ARFCN=X;
    PCI=1 with reference signals in QCL source associated to cell A;
TCI-State-NSC(2), for non-serving cell A;
    PCI=5 and ARFCN=X;
    TCI=2 with reference signals in QCL source associated to cell A;
TCI-State-NSC(3), for non-serving cell B;
    PCI=13 and ARFCN=Y;
    TCI=3 with reference signals in QCL source associated to non-serving cell B;
TCI-State-NSC(4), for non-serving cell B;
    PCI=13 and ARFCN=Y;
    TCI=4 with reference signals in QCL source associated to non-serving cell B;

Table 17 below shows how the information could be structured in a non-optimized case:

TABLE 17

RRCReconfiguration
- Configuration of a plurality of non-serving cells
- Each non-serving cell configuration contains
  - A configuration reference e.g. Non-serving cell index
  - Non-serving cell specific configuration e.g. as in ServingCellConfigCommon
  - Configuration of SSB properties e.g. SMTC
- TCI state configuration
  - QCL info
    - Reference signal configuration e.g. SSB index
      - Reference to non-serving cell where the SS properties for that SSB index is to be found Table 18 below shows another way to present the information:

TABLE 18

RRCReconfiguration
-   Configuration of a plurality of non-serving cells
    - Non-serving cell configuration(1), non-serving cell index=1
    - Non-serving cell configuration(2), non-serving cell index=2
    - . . .
    - Non serving cell configuration(K), non-serving cell index=K
-   AddMod list of TCI state configuration(s)
    - QCL Info
      -   Reference signal configuration e.g. SSB index
        - Reference to non-serving cell where the SS properties for that SSB index is to be found e.g. non-serving cell index=k In another approach, the QCL information configuration of a TCI state configuration contains a reference/pointer to the cell the reference signal indicated is associated to, wherein the reference/pointer is the PCI and a reference to a measurement object configuration (such as measurement object identifier) for the non-serving cell, as follows in Tables 19 and 20:

TABLE 19

```
-- ASN1START
-- TAG-TCI-STATE-START
TCI-State ::=      SEQUENCE {
  tci-StateId       TCI-StateId,
  qcl-Type1         QCL-Info,
  qcl-Type2         QCL-Info           OPTIONAL, -- Need R
  . . .
}
QCL-Info ::=        SEQUENCE {
  cell              ServCellIndex      OPTIONAL, -- Need R
  physCellId        PhysCellId             OPTIONAL
  measObjectId      MeasObjectId       OPTIONAL,
  bwp-Id            BWP-Id             OPTIONAL,
                                       -- Cond CSI-RS-Indicated
  referenceSignal   CHOICE {
    csi-rs                  NZP-CSI-RS-ResourceId,
    ssb                     SSB-Index
  },
```

TABLE 19-continued

| qcl-Type | ENUMERATED {typeA, typeB, typeC, typeD}, |
|---|---|

```
. . .
}
-- TAG-TCI-STATE-STOP
-- ASN1STOP
```

TABLE 20

QCL-Info field descriptions bwp-Id
The DL BWP which the RS is located in.
cell
The UE's serving cell in which the referenceSignal is configured. If the field is absent, it
applies to the serving cell in which the TCI-State is configured. The RS can be located on a
serving cell other than the serving cell in which the TCI-State is configured only if the qcl-
Type is configured as typeC or typeD. See TS 38.214 [19] clause 5.1.5. if the TCI state is
associated to a non-serving cell, this field is absent.
referenceSignal
Reference signal with which quasi-collocation information is provided as specified in TS
38.214 [19] subclause 5.1.5.
qcl-Type
QCL type as specified in TS 38.214 [19] subclause 5.1.5.
physCellId
PCI of a non-serving cell in which the referenceSignal is configured. The field is absent if
the referenceSignal is configured for a serving cell.
measObjectId
Indicates the measurement object (as in MeasConfig) containing the SSB properties for that
non-serving cell used as QCL source for that TCI state such as frequency information of a
non-serving cell in which the referenceSignal is configured.

Block 715

This corresponds to an inter-frequency inter-cell mobility command with a L1/L2 signaling.

A L1/L2 signaling may correspond to a MAC CE including at least one of the following:

a TCI state identifier that corresponds to one of the TCI state identifiers the UE is configured with;

a serving cell reference to indicate in which of the serving cell configuration the TCI state is configured:

Upon reception of the MAC CE, the UE determines the TCI state being indicated and its QCL configuration. Then, the UE determines that the indicated TCI state is associated to a non-serving cell whose SSB is in a different frequency.

The network may indicate a TCI state for PDCCH reception for a CORESET of a Serving Cell or of a Non-Serving Cell by sending the TCI State Indication for UE-specific PDCCH MAC CE. At the UE, the MAC entity (associated to the UE's current serving cell) shall:

1> if the MAC entity receives a TCI State Indication for UE-specific PDCCH MAC CE on a Serving Cell:

2> indicate to lower layers the information regarding the TCI State Indication for UE-specific PDCCH MAC CE.

Upon the indication of the TCI state, the lower layer determine whether the QCL source associated to the indicated TCI state has a reference signal associated to a non-serving cell e.g. if the QCL information is associated to a non-serving cell configuration, possibly in a different frequency.

Block 719

In some embodiments, the PDCCH configuration is a PDCCH configuration of a non-serving cell. Monitoring the PDCCH in these embodiments includes monitoring the PDCCH configuration of the non-serving cell based on the downlink frequency information. In other embodiments, the PDCCH configuration is monitored by monitoring a CORESET.

Operations of a RAN node 500 (implemented using the structure of FIG. 5) will be discussed with reference to the flow chart of FIG. 8 according to some embodiments of inventive concepts. For example, modules may be stored in memory 505 of FIG. 5, and these modules may provide instructions so that when the instructions of a module are executed by respective RAN node processing circuitry 503, processing circuitry 503 performs respective operations of the flow chart. According to some embodiments of, a method at a network node (called a gNodeB—gNB) 500 is provided, the method includes blocks 805 to block 819.

Figure 8:
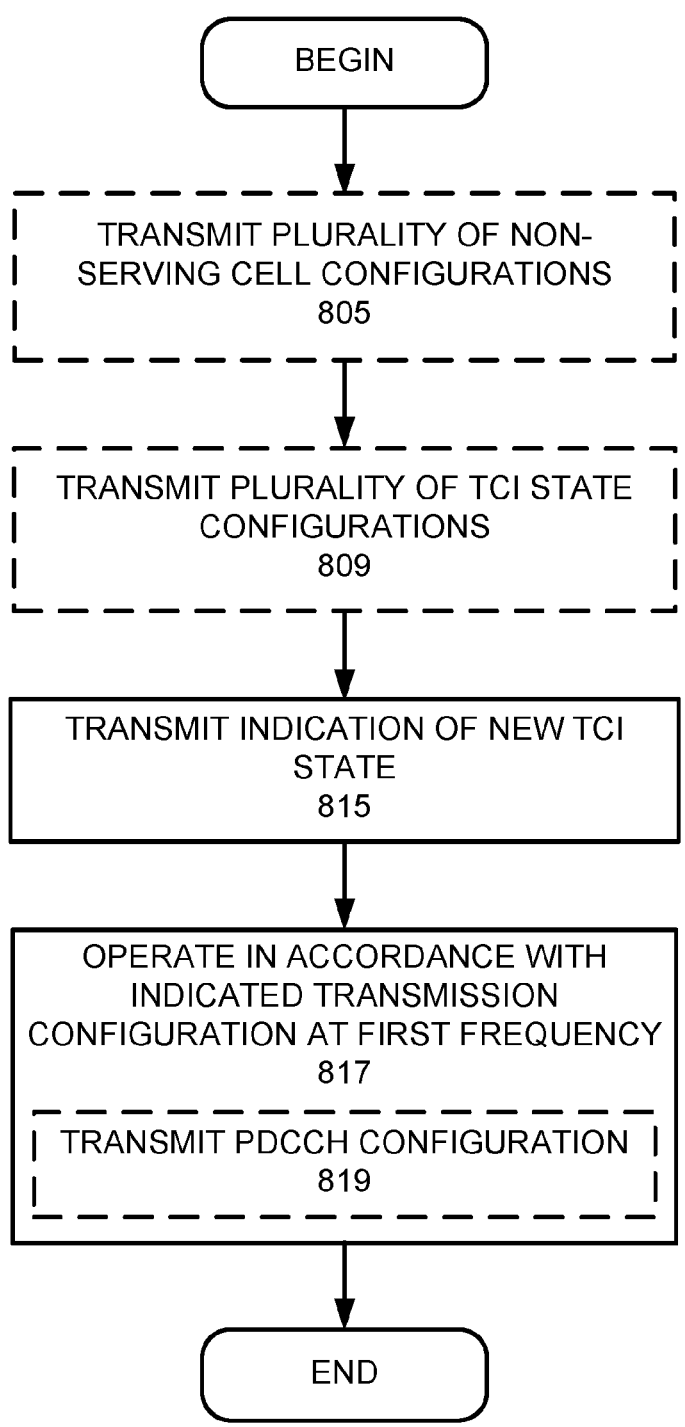
FIG. 8 is a flow chart illustrating operations of a RAN node according to some embodiments.

Various operations from the flow chart of FIG. 8 may be optional with respect to some embodiments of RAN nodes and related methods.

In block 805, the method may include the network node 500 transmitting, to the UE 400, a plurality of transmission configurations (e.g., non-serving cell configuration(s) for at least one non-serving cell), where each of the plurality of transmission configurations indicates a respective frequency of the respective cell and/or a respective cell reference of the respective cell. Each transmission configuration can be used to configure a non-serving cell for L1/L2 based inter-cell mobility and may contain an identity (e.g., PCI) of the non-serving cell and frequency information.

In some embodiments, the non-serving configuration contains a non-serving cell SSB frequency, and the SS/PBCH Block (SSB) frequency of the at least one non-serving cell is in a different frequency than the frequency of the serving cell's SSB.

In some other embodiments, the non-serving cell configuration contains a non-serving cell reference. The non-serving cell reference can correspond to an integer in some of these other embodiments. The non-serving cell reference can correspond to a non-serving cell index, which may be an integer in other embodiments of these other embodiments that can be later referred to in another configuration, such as a TCI state configuration. In further embodiments of these other embodiments, the cell reference can correspond to the combination of Physical Cell Identity and the SSB frequency location (e.g. ARFCN)

In block 809, the method may include the network node 500 transmitting to the UE 400 a plurality of TCI state configurations. In some embodiments, at least one of the TCI states is associated to a QCL configuration associated to a non-serving cell. For example, the QCL configuration can contain the non-serving cell reference, e.g. a non-serving cell index. The QCL configuration can also contain an identification of a frequency (e.g. Measurement Object Id) and the PCI, so the UE knows that the QCL of a configured TCI state is associated to the PCI to be searched/synchronized in a frequency as indicated by the identification of a frequency and/or further frequency-specific configuration associated.

In other embodiments, at least one of the TCI states is associated to a TCI state identifier.

In block 815, the method includes the network node 500 transmitting to the UE 400 an indication of a transmission configuration to be activated from the plurality of transmission configurations, the indicated transmission configuration comprising a first frequency that is different from a second frequency of a current transmission configuration. In some embodiments, the network node 500 transmits the indication of the transmission configuration by transmitting an indication of a TCI state among the plurality of TCI states, the indicated TCI state being associated with a QCL configuration that is associated with the first frequency.

The transmitting may be in the form of a L1/L2 signaling indicating the UE 400 a new TCI state wherein the QCL source of that new TCI state is associated to an SSB that is in a different frequency location than the SSB associated to the current TCI state. In some embodiments, a L1/L2 signaling may correspond to a MAC CE including a TCI state identifier that corresponds to one of the TCI state identifiers the UE 400 is configured with.

In block 817, the network node 500 operates in accordance with the indicated transmission configuration at the first frequency.

In some embodiments of operating in accordance with the indicated transmission configuration, the network node 500 may determine to transmit a PDCCH configuration (e.g. CORESET) associated to the new TCI state i.e. according to the new QCL source in the SSB located in the first frequency.

As such, in block 819, the method includes the network node 500 transmitting a PDCCH configuration (e.g. CORESET) associated to the new TCI state i.e. according to the new QCL source in the SSB located in the different frequency, upon the need to transmit data to the UE 400.

In another example, the network can schedule the UE according to the TCI state that is currently considered as being monitored by the UE, according to the configured QCL source of that TCI state; in other words, the network can indicate scheduling to the UE in the beam associated to the QCL source the UE is currently monitoring.

According to some embodiments of inventive concepts, it may be possible to realize L1/L2 inter-cell centric mobility between inter-frequency neighbour cells. In other words, in an efficient signaling manner, it is possible to configure the UE 400 to monitor MAC CEs for a possible indication of a new TCI state associated to an SSB in a different frequency than the SSB of the current serving cell (i.e. the current TCI state the UE 400 is monitoring before receiving the MAC CE).

One advantage of inter-frequency L1/L2 mobility is the flexibility of possibly triggering a more dynamic load balancing function without the need for radio resource management (RRM) measurements, especially for serving cells and non-serving cells associated to the same gNodeB.

Various embodiments of the configurations transmitted to the UE 400, the serving cell, and the signaling are described above with respect to block 705 and Tables 1-20.

Figure 9:
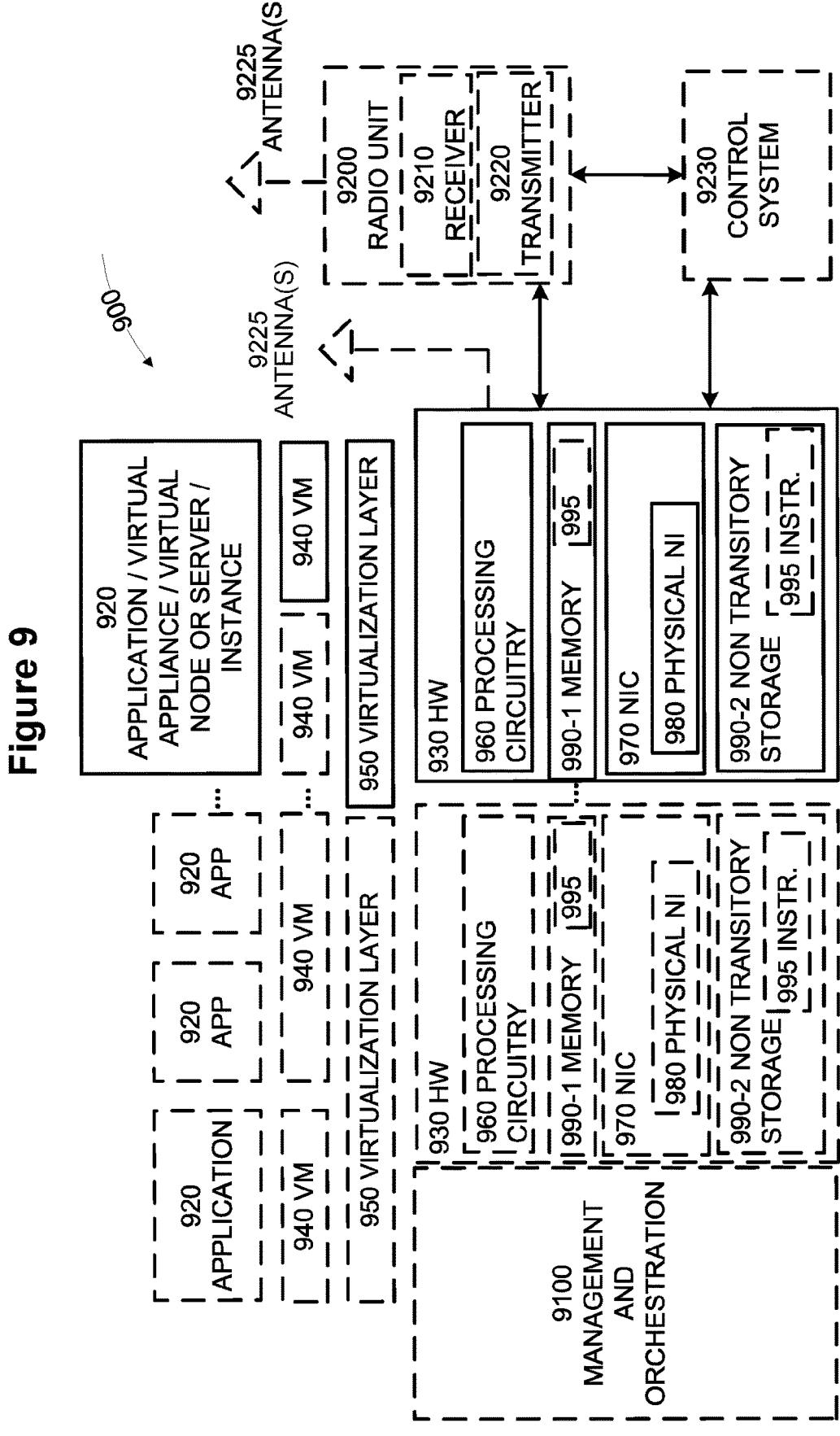
FIG. 9 is a block diagram of a virtualization environment in accordance with some embodiments.

FIG. 9 illustrates a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940 comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a user equipment (UE) configured with a plurality of transmission configurations associated with one or more cells, each cell associated with a frequency, the method comprising:

receiving an indication of a transmission configuration to be activated from the plurality of transmission configurations, the indicated transmission configuration comprising a first frequency that is different from a second frequency of a current transmission configuration; and operating in accordance with the indicated transmission configuration at the first frequency.

2. The method of claim 1, further comprising:

obtaining the plurality of transmission configurations, wherein each of the plurality of transmission configurations indicates a respective frequency of the respective cell and/or a respective cell reference of the respective cell.

3. The method of claim 2, wherein the plurality of transmission configurations comprises a plurality of non-serving cell configurations for respective non-serving cells of a communication network, wherein each of the plurality of non-serving cell configurations indicates a respective frequency of the respective non-serving cell and/or a respective non-serving cell reference of the respective non-serving cell.

4. The method of claim 3, wherein the plurality of non-serving cell configurations are received from a serving cell of the communication network, and wherein a frequency of the serving cell is different than the respective frequency of each of the respective non-serving cells.

5. The method of claim 4, wherein the current TCI state is associated with the serving cell.

6. The method of claim 2, wherein the plurality of transmission configurations comprises a plurality of Transmission Configuration Indicator (TCI) state configurations for a respective plurality of TCI states, wherein at least one of the plurality of TCI states is associated with a quasi-co-location (QCL) configuration that is associated with a non-serving cell, and wherein at least one of the plurality of TCI states is associated with a TCI identifier.

7. The method of claim 6, wherein receiving the indication of the transmission configuration to be activated comprises receiving an indication of a TCI state among the plurality of TCI states, the indicated TCI state being associated with a QCL configuration that is associated with the first frequency.

8. The method of claim 7, wherein the indication of the TCI state is received using layer 1 (L1) and/or layer 2 (L2) signaling.

9. The method of claim 7, wherein the indication of the TCI is received using a Medium Access Control (MAC) Control Element (CE).

10. The method of claim 6, wherein the QCL configuration includes an identification of a frequency and a PCI of a non-serving cell.

11. The method of claim 10, wherein the identification of the frequency comprises a Measurement Object Identifier (ID).

12. The method of claim 1, wherein operating in accordance with the indicated transmission configuration at the first frequency comprises monitoring a physical downlink control channel (PDCCH) based on the indicated transmission configuration.

13. The method of claim 12, wherein receiving the indication of the transmission configuration to be activated comprises receiving an indication of a TCI state among the plurality of TCI states, wherein the indicated TCI state includes a PCI of a non-serving cell and downlink frequency information of the non-serving cell, wherein the PDCCH configuration is a PDCCH configuration of the non-serving cell, and wherein monitoring the PDCCH configuration comprises monitoring the PDCCH configuration of the non-serving cell based on the downlink frequency information.

14. The method of claim 12, wherein monitoring the PDCCH configuration comprises monitoring a Control Resource Set (CORESET).

15. The method of claim 1, wherein each of the first frequency and the second frequency comprises a Synchronization Signal and/or Physical Broadcast Channel (SSB) frequency.

16. The method of claim 1, wherein the plurality of transmission configurations comprises a plurality of non-serving cell configurations for respective non-serving cells of a communication network, and wherein each of the respective non-serving cell references corresponds to at least one of an integer, a non-serving cell index, and/or a combination of a Physical Cell Identity (PCI) and a SSB frequency location.

17. The method of claim 16, wherein each of the respective non-serving cell references corresponds to a combination of a PCI and an SSB frequency location comprising an Absolute Radio Frequency Channel Number (ARFCN).

18. A method of operating a radio access network (RAN) node in communication with a user equipment (UE) configured with a plurality of transmission configurations associated with one or more cells, each cell associated with a frequency, the method comprising:

transmitting, to the UE, an indication of a transmission configuration to be activated from the plurality of transmission configurations, the indicated transmission configuration comprising a first frequency that is different from a second frequency of a current transmission configuration; and responsive to transmitting the indication of the transmission configuration to be activated, communicating data with the UE on the first frequency.

19. The method of claim 18, further comprising:

transmitting, to the UE, the plurality of transmission configurations, wherein each of the plurality of transmission configurations indicates a respective frequency of the respective cell and/or a respective cell reference of the respective cell.

20. The method of claim 19, wherein the plurality of transmission configuration comprises a plurality of non-serving cell configurations, and wherein each of the plurality of non-serving cell configurations indicates a respective frequency of the respective non-serving cell and/or a respective non-serving cell reference of the respective non-serving cell.

* * * * *